United States Patent Office 3,354,139
Patented Nov. 21, 1967

3,354,139
PROCESS FOR POLYMERIZING OLEFINS
Edwin J. Vandenberg, Blue Rock Manor, Wilmington, Del., assignor to Hercules Incorporated, a corporation of Delaware
No Drawing. Filed May 18, 1955, Ser. No. 509,396
15 Claims. (Cl. 260—94.9)

This invention relates to an improved process for polymerizing ethylene under relatively mild conditions of pressure and temperature and, more particularly, to a method of controlling the molecular weight of the polyethylene produced so that the polymer may be produced in any desired range of molecular weight.

In U.S. applications of K. Ziegler et al., Ser. No. 469,059 filed Nov. 15, 1954; Ser. No. 482,412 filed Jan. 17, 1955; and Ser. No. 482,413 filed Jan. 17, 1955, there is described a new process of polymerizing ethylene to a high molecular weight polyethylene under relatively mild conditions of temperature and pressure by using as the catalyst for the polymerization a mixture of a compound of a metal of Groups IV-B, V-B, VI-B or VIII of the Periodic Table, or manganese, in combination with an organometallic compound of an alkali metal, alkaline earth metal, zinc, earth metal (especially aluminum), or rare earth metal. The process is usually carried out by mixing the two catalyst components in a hydrocarbon diluent and then passing the ethylene into the catalyst mixture at atmospheric or slightly elevated pressure and at room temperature or moderately elevated temperatures. This process is so effective that ethylene is rapidly polymerized to a polymer of very high molecular weight, frequently within the range of 300,000 to 3,000,000 or higher. Such polymers have very high viscosities, melting point, etc. For many purposes, as for example, in plastic molding, a molecular weight within the range of 30,000 to 300,000 is desired.

Now, in accordance with this invention, it has been found that the molecular weight of the polymer, as indicated by its viscosity, may be controlled within any desired range by the addition of a controlled amount of certain haloalkanes to the above polymerization systems. Thus, if a polyethylene of a certain range of molecular weight is desired, it may be produced by the addition of a specified quantity of a haloalkane, the amount of the latter being determined by the catalyst combination employed, the specific haloalkane being added, etc.

In the polymerization of ethylene using as the catalyst an organometallic compound in combination with a transition metal compound, the molecular weight of the polymer varies with the ratio of organometallic compound to transition metal compound. Hence, for a lower molecular weight polyethylene, a low ratio of organometallic to transition metal compound is used. Since the organometallic compounds used in this catalyst system are sensitive to impurities, only a very small amount of an impurity will very greatly alter a low ratio of organometallic compound to transition metal compound and it is, therefore, preferable to operate at a higher ratio of organometallic compound to transition metal compound. When a haloalkane is present in the system, there is much less increase in molecular weight of the polyethylene with increasing ratio of organometallic to transition metal compound and it is then possible to use the higher ratios and still obtain a polyethylene in the lower range of molecular weights.

Any haloalkane containing at least one halogen having an atomic weight within the range of 35 to 80, i.e., containing at least one chlorine or bromine atom, may be utilized in accordance with this invention for the control of the molecular weight range of the polyethylene produced. Other halogens may also be present in the haloalkane but at least one chlorine atom, and preferably two chlorine atoms, or at least one bromine atom should be present in the haloalkane molecule in order to obtain a substantial reduction in the molecular weight of the polymer over that produced in the absence of such haloalkane. The degree of such reduction or control will depend upon the haloalkane being used, the amount included in the polymerization, etc. In general, a polyhaloalkane, containing at least one chlorine or bromine, is the most effective type of haloalkane for controlling the molecular weight of the polymer under any given set of conditions. A particularly effective group of polyhaloalkanes, that may be utilized in accordance with this invention for the control of the molecular weight range of the polyethylene, are those having the formula

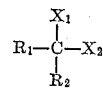

where $X_1$ is chlorine or bromine and when $X_1$ is chlorine, $X_2$ is chlorine or bromine and when $X_1$ is bromine, $X_2$ is chlorine, bromine, iodine, or fluorine and $R_1$ and $R_2$ are each one of the group of hydrogen, chlorine, bromine, fluorine, iodine, alkyl, chloroalkyl, bromoalkyl, iodoalkyl, or fluoroalkyl radicals.

Exemplary of the haloalkanes that may be used in accordance with this invention for controlling the molecular weight of the polymer produced, when ethylene is polymerized with the catalyst combinations described in the above-mentioned Ziegler applications, are carbon tetrachloride, carbon tetrabromide, trifluorobromomethane, trifluorochloromethane, trichlorobromomethane, tribromochloromethane, dichlorodifluoromethane, dibromodifluoromethane, dichlorodibromomethane, chloroform, bromoform, methylene chloride, methylene bromide, 1,1-dichloroethane, 1,1-dibromoethane, 1,2-dichloroethane, 1,2-dibromoethane, 1,1,1,2 - tetrachloroethane, 1,1,1,2 - tetrabromoethane, symmetrical tetrachloro- and tetrabromo-ethanes, hexachloroethane, hexabromoethane, 1,1,2,2-tetrachloro-1,2-difluoroethane, perchloropropane, perchlorobutane, n-butylchloride, n-butylbromide, isobutylchloride, isobutylbromide, tert-butyl chloride, tert-butyl bromide, tert-amyl bromide, n-hexyl bromide, tert-octyl bromide, etc. Haloalkanes of longer carbon chains may be used but are less effective per unit weight.

The polymerization of ethylene in accordance with this invention is carried out by mixing the transition metal compound and organometallic compound, usually in an inert organic diluent, and then passing the ethylene into the reaction mixture, the haloalkane being added either prior to or during the addition of the ethylene. As already pointed out, the transition metal compound may be a compound of any metal of Groups IV-B, V-B, VI-B or VIII of the Periodic Table, i.e., titanium, zirconium, hafnium, thorium, vanadium, columbium, tantalum, chromium, molybdenum, tungsten, uranium, iron, cobalt, nickel, etc., or manganese. The compound may be an inorganic salt such as a halide, oxyhalide, etc., or an organic salt or complex such as an acetylacetonate, etc. Of particular value are the metal halides such as titanium tetrachloride. Exemplary of the transition metal compounds that may be used are titanium and zirconium tetrachloride, manganous chloride, nickelous chloride, ferrous chloride, ferric chloride, tetrabutyl titanate, zirconium acetylacetonate, vanadium oxy acetylacetonate, chromium acetylacetonate, etc. The organo-metallic compound that is reacted with one of the transition metal compounds or mixtures thereof may be any organo compound of an alkali metal, alkaline earth metal, zinc, earth metal, or rare earth metal, as for example, alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc.

When the transition metal compound and the organometallic compound are mixed, a reaction takes place which is believed to be a reduction of the transition metal compound from the higher valence state of the transition metal to one or more lower valence states. The molar ratio of the organometallic compound to the transition metal compound may be varied over a wide range, but there should be used an amount of the organometallic compound that will produce the desired amounts of reduction. Thus, larger ratios of organometallic compound to the transition metal compound are required for alkali alkyls than for trialkylaluminum compound, and in the same way more of an alkyl aluminum dihalide is required than of a dialkylaluminum monohalide. In general, the molar ratio of organometallic compound to transition metal compound will be from about 0.1:1 to 100:1 and more usually will be from about 0.3:1 to 10:1.

The reaction between the transition metal compound and the organometallic compound is readily carried out by mixing the two compounds in any inert diluent, as for example, aliphatic hydrocarbons such as hexane, heptane, isooctane, etc., cycloaliphatic hydrocarbons such as cyclohexane, or aromatic hydrocarbons such as benzene, toluene, xylene, etc., halogenated aromatic hydrocarbons such as chlorobenzenes, chloronaphthalenes, etc., or any mixture of such inert diluents. Any concentration of the two reagents may be used that is convenient. The reaction of the two compounds may be carried out at any temperature and generally is determined by the solvent, if used, the activity of the reactants, etc. For example, some metal alkyls might react at Dry Ice temperatures whereas others would require elevated temperatures. Usually the reaction is conveniently carried out at room temperature or at slightly elevated temperatures, but a temperature of from about −50° C. to about 150° C. could be used. The activity of the catalyst system is in some cases further enhanced by allowing it to age before use. This aging may be carried out by allowing the reaction mixture to stand at room temperature or thereabouts for anywhere from a few hours to weeks, or it may be greatly speeded up by carrying out the aging at elevated temperatures up to a temperature of 100° C. or above. The catalyst suspension in the inert diluent is readily stored at low temperatures such as 0° C. or below until it is to be used, any further aging effects or other changes thereby being substantially minimized.

The haloalkane used to control the degree of polymerization may be added to the catalyst and diluent prior to contacting the ethylene with the catalyst or the polymerization may be allowed to proceed for a specified length of time and then the haloalkane added, or the haloalkane may be added in small increments throughout the polymerization. Gaseous haloalkanes can be bled into the ethylene stream and so accurately control the amount of modifier present in the system at any time. The amount of the haloalkane that is added will depend upon the catalyst system that is being used, the conditions of the reaction, as for example, temperature and pressure, and on the haloalkane itself. Some haloalkanes, as for example, carbon tetrachloride, carbon tetrabromide, etc., effect a greater reduction in the molecular weight range whereas the same amount of other haloalkanes, as for example, methylene chloride or 1,2-dichloroethane, has a much smaller effect upon the reduction of the molecular weight. Thus a greater amount of the latter haloalkanes is required. Some of the haloalkanes also exhibit an effect on the polymerization rate as well as on the molecular weight of the polymer, causing in some cases an acceleration and in others a retardation of the polymerization. The amount of such acceleration or retardation is dependent on the concentration of the haloalkane, the catalyst used, and the ratio of organometallic compound to transition metal compound in the catalyst. Thus the amount of haloalkane added to the polymerization system will depend upon all of these factors, but will in general be within the range of from about 0.001% of the diluent to use of the haloalkane as the sole diluent. For the more active haloalkanes the amount used will preferably be within the range of about 0.05% to about 5% of the diluent and for the less active haloalkanes from about 1% to essentially all of the diluent.

The polymerization process may be carried out in a wide variety of ways, as for example, either as a batch or continuous operation and with or without the use of an inert organic diluent as the reaction medium. Usually a diluent is preferred for carrying out the process. Any inert liquid organic solvent may be used as the diluent, as for example, aliphatic hydrocarbons such as hexane, heptane, isooctane, etc., cycloaliphatic hydrocarbons such as cyclohexane, aromatic hydrocarbons such as benzene, toluene, xylene, etc., or any mixture of such hydrocarbons, halogenated aromatic hydrocarbons such as chlorobenzenes, chloronaphthalenes, etc. As already pointed out above, a haloalkane, or any combination of them, may be used as the diluent, particularly when the haloalkane is one that does not too greatly retard the polymerization or have too great a reducing effect on the molecular weight of the polymer or in the case where a very large effect is desired, as for example, a relatively low molecular weight polymer is desired. The selection of the temperature and pressure used for the polymerization process will obviously depend upon the activity of the catalyst system being used, the degree of polymerization desired, etc. In general, the polymerization will be carried out at room temperature or slightly above, but any temperature within the range of from about −50° C. to about 150° C. and preferably from about −20° C. to about 100° C. may be used. In the same way, while atmospheric pressure or a pressure of only a few pounds may be used, the polymerization may be carried out over a wide range of pressures, as for example, from a partial vacuum to about 1000 lbs. and preferably from about atmospheric to about 500 lbs. pressure. Higher pressures may, of course, be used, but generally do not appreciably alter the course of the polymerization.

The following examples will illustrate the process of polymerizing ethylene in accordance with this invention and some of the many variations that can be made in this process. As will be seen from these examples, it is possible to select the proper conditions to prepare a polymer of any desired molecular weight by means of the process of this invention. The molecular weight of the polymers produced in these examples is shown by the reduced specific viscosity (RSV) given for each. By the term "reduced specific viscosity" is meant the $\eta_{sp.}/c$. determined on an 0.1% solution of the polymer in Decalin, containing 0.1 g. of the polymer per 100 ml. of solution, at 135° C. Where the melting point of the polymer is given, it is the temperature at which the birefringence due to crystallinity disappears. All parts and percentages are by weight unless otherwise indicated.

*Examples 1–10*

The same general procedure was used for each of these examples with the exceptions of variations noted below. For each example two polymerization vessels in which the air had been replaced with nitrogen were each charged with 33 parts of n-heptane, 1 part of carbon tetrachloride being added to one vessel out of each pair, and after evacuating, 2 parts of ethylene was added to each vessel, the polymerization vessel was then equalized at 30° C., and the catalyst added. In all cases, except in Examples 8a and b, the aluminum alkyl and titanium tetrachloride were mixed in 1.4 parts n-heptane and the catalyst suspension so obtained was aged for about two hours at room temperature and then added to the polymerization vessel, except that in Examples 4a and b the catalyst suspension was aged for 8 days at room temperature before being used. In Examples 8a and b and 9a and b the catalyst was added to the diluent alone or combination of diluent with carbon tetrachloride and allowed to stand for 1 hour before the ethylene was added to the polymerization vessel, the aluminum alkyl and titanium tetrachloride being mixed in situ in Example 8, i.e., in the presence of carbon tetrachloride in Example 8b. The initial pressure after ethylene addition was about 50 p.s.i.g. in each case. When the polymerization was substantially complete as indicated by a drop in the gage pressure to 0 p.s.i., 4 parts of anhydrous ethanol was introduced to stop the polymerization. A polymer which had separated as an insoluble precipitate in each case was separated by filtration, washed twice with n-heptane, twice with absolute ethanol, refluxed for 15 minutes with 40 parts of a 10% methanolic solution of hydrogen chloride, filtered, and the polymer was washed with methanol until the filtrate was acid-free. The polymers so obtained were then dried for 4 hours at 80° C. in vacuo. The aluminum alkyl, molar ratio of aluminum alkyl to titanium tetrachloride, and amounts of each ingredient are set forth in Table I below along with the reaction time, percent conversion, and reduced specific viscosity of the polymer produced.

parts of n-heptane and the haloalkane, if any, then evacuated and 2 parts of ethylene was added. After equalizing at 30° C. the catalyst suspension prepared by mixing 18.08 parts of diethylaluminum chloride with 4.75 parts of titanium tetrachloride (molar ratio of 6:1) in n-heptane was added. The initial pressure was about 50 p.s.i.g. When the polymerization was substantially complete as indicated by a drop in the gage pressure to 0 p.s.i., the polymerization was stopped by the addition of anhydrous ethanol as in the foregoing examples and the polymers were isolated as in those examples. The haloalkane and the amount of it added in each case are set forth in Table II below along with the percent conversion and reduced specific viscosity of the polymer obtained in each case.

TABLE II

| Ex. No. | Additive | Parts | Reaction Time, hrs. | Percent Conv. | RSV |
|---|---|---|---|---|---|
|  | None | | 0.6 | 78 | 26.4 |
| 11 | CHCl$_3$ | 1.0 | 0.4 | 76 | 11.0 |
| 12 | CH$_2$Cl$_2$ | 1.0 | 0.75 | 81 | 18.4 |
| 13 | CH$_2$ClCH$_2$Cl | 1.0 | 1.0 | 93 | 20.9 |
|  | None | | 0.6 | 88 | 23.5 |
| 14 | CBr$_4$ | 1.0 | 0.25 | 87 | 3.3 |
| 15 | n-Butyl Br | 1.0 | 2.0 |  | 17.8 |
|  | None | | 0.6 | 79 | 24.6 |
| 16a | Isobutyl Cl | 0.01 | 1.5 | 77 | 22.1 |
| 16b | ___do___ | 0.03 | 3.0 | 76 | 16.2 |
|  | None | | 1.2 | 88 | 17.9 |
| 17 | CBrCl$_3$ | 1.0 | 0.6 | 90 | 3.7 |
| 18a | t-butyl Br | 0.03 | 2.5 | 83 | 14.1 |
| 18b | ___do___ | 0.1 | 18 (−5 p.s.i.) | 87 | 8.5 |

*Example 19*

In this example the catalyst system was a hydrocarbon-insoluble reaction product of triethylaluminum and titanium tetrachloride used in conjunction with triisobutylaluminum. The insoluble reaction product was prepared by mixing 0.057 part of triethylaluminum with 0.0475 part of titanium tetrachloride (molar ratio of 2:1) in n-heptane, filtering off the precipitate, washing it twice with n-heptane, and resuspending the precipitate in n-heptane.

TABLE I

| Ex. No. | Al Alkyl | Parts ×10$^{-2}$ | TiCl$_4$ Parts ×10$^{-2}$ | A:T Ratio [1] | Remarks | CCl$_4$, parts | Reaction Time, hrs.[2] | Percent Conv. | RSV |
|---|---|---|---|---|---|---|---|---|---|
| 1a | Al(C$_2$H$_5$)$_3$ | 10.7 | 4.75 | 3.75:1 | Catalyst aged about 2 hrs. at room temperature. |  | 0.8 | 80 | 50 |
| 1b | Al(C$_2$H$_5$)$_3$ | 10.7 | 4.75 | 3.75:1 | ___do___ | 1.0 | 3.0 | 76 | 13.9 |
| 2a | Al(C$_2$H$_5$)$_3$ | 5.7 | 4.75 | 2:1 | ___do___ |  | <0.25 | 92 | 20.3 |
| 2b | Al(C$_2$H$_5$)$_3$ | 5.7 | 4.75 | 2:1 | ___do___ | 1.0 | 2.0 | 82 | 6.6 |
| 3a | Al(C$_2$H$_5$)$_3$ | 2.85 | 4.75 | 1:1 | ___do___ |  | 0.7 | 90 | 16.1 |
| 3b | Al(C$_2$H$_5$)$_3$ | 2.85 | 4.75 | 1:1 | ___do___ | 1.0 | 0.5 | 90 | 7.5 |
| 4a | Al(C$_2$H$_5$)$_3$ | 3.5 | 4.75 | 1.24:1 | Catalyst aged 8 days at room temperature. |  | 1.4 | 89 | 30.5 |
| 4b | Al(C$_2$H$_5$)$_3$ | 3.5 | 4.75 | 1.24:1 | ___do___ | 1.0 | 0.3 | 92 | 8.0 |
| 5a | Al(isobutyl)$_3$ | 19.8 | 4.75 | 4:1 | Catalyst aged about 2 hrs. at room temperature. |  | 3.0 | 83 | 46.7 |
| 5b | Al(isobutyl)$_3$ | 19.8 | 4.75 | 4:1 | ___do___ | 1.0 | 3.0 (13 p.s.i.) | 67 | 13.1 |
| 6a | Al(isobutyl)$_3$ | 9.9 | 4.75 | 2:1 | ___do___ |  | 0.2 | 87 | 20.3 |
| 6b | Al(isobutyl)$_3$ | 9.9 | 4.75 | 2:1 | ___do___ | 1.0 | 1.4 | 87 | 4.4 |
| 7a | Al(isobutyl)$_3$ | 5.9 | 4.75 | 1.2:1 | ___do___ |  | 0.25 | 96 | 8.7 |
| 7b | Al(isobutyl)$_3$ | 5.9 | 4.75 | 1.2:1 | ___do___ | 1.0 | 0.25 | 96 | 3.8 |
| 8a | Al(C$_2$H$_5$)$_2$Cl | 18.08 | 4.75 | 6:1 | Catalyst formed in situ. |  | 0.6 | 79 | 25.4 |
| 8b | Al(C$_2$H$_5$)$_2$Cl | 18.08 | 4.75 | 6:1 | ___do___ | 1.0 | 2.0 | 91 | 5.0 |
| 9a | Al(C$_2$H$_5$)$_2$Cl | 18.08 | 4.75 | 6:1 | Catalyst preformed. |  | 0.6 | 75 | 27.9 |
| 9b | Al(C$_2$H$_5$)$_2$Cl | 18.08 | 4.75 | 6:1 | ___do___ | 1.0 | 0.25 | 88 | 8.1 |
| 10a | Al(C$_2$H$_5$)$_2$Cl | 6.03 | 4.75 | 2:1 | Catalyst aged about 2 hrs. at room temperature. |  | 0.5 | 87 | 15.4 |
| 10b | Al(C$_2$H$_5$)$_2$Cl | 6.03 | 4.75 | 2:1 | ___do___ | 1.0 | 0.5 | 91 | 6.7 |

[1] Molar ratio of aluminum alkyl to titanium tetrachloride.
[2] Time to 0 gage pressure unless otherwise indicated.

*Examples 11–18*

In these examples the effect of various haloalkanes in the polymerization of ethylene is shown in comparison to a control polymerization carried out under identical conditions but without the addition of the haloalkane.

In each series, the polymerization vessels, in which the air was replaced with nitrogen, were each engaged with 33

The air in a pair of polymerization vessels was replaced with nitrogen and each was then charged with 33 parts of n-heptane, evacuated, and 2 parts of ethylene was added. After equalizing at 30° C., 0.107 part of triisobutylaluminum in n-heptane and the suspension of insoluble reaction product prepared above were added. The initial pressure was about 50 p.s.i.g. To one vessel was added 1 part of carbon tetrachloride. When the polymerization was essentially complete, 4 parts of anhydrous ethanol was added to stop the polymerization. The polymer was then isolated as in the foregoing examples. In the control, where no haloalkane was added, the pressure had dropped to −7 p.s.i.g in 15 minutes and the polymer had an RSV of 12.1 and melting point of 139° C. In the case where the carbon tetrachloride was added, the pressure dropped to 9 p.s.i. in 3.5 hours and the polymer had an RSV of 4.6 and melting point of 134° C.

Example 20

Example 19 was repeated except that the hydrocarbon-insoluble reaction product used as one of the catalyst components was prepared from 0.0603 part of diethylaluminum chloride and 0.0475 part of titanium tetrachloride (molar ratio of 2:1) and 0.094 part of amylsodium was used as the second catalyst component in place of the triisobutylaluminum used in that example. In the control, where no haloalkane was added, the polymer had an RSV of 12.5, whereas when 1 part of carbon tetrachloride was present, the RSV of the polymer was reduced to 2.3.

Example 21

The hydrocarbon-insoluble reaction product prepared by mixing 0.0285 part of triethylaluminum and 0.0475 part of titanium tetrachloride (molar ratio of 1:1) in n-heptane was separated and washed as described in Example 19.

Each of three polymerization vessels (nitrogen atmosphere) was charged with 33 parts of n-heptane, evacuated, and 2 parts of ethylene was added. After equalizing at 30° C., 0.057 part of triethylaluminum and the suspension of insoluble reaction product prepared above were added. One polymerization was run as a control without any haloalkane, to another was added 1.4 parts of dichlorodifluoromethane, and to the third 1 part of carbon tetrachloride. After 15 minutes the polymerization was essentially complete as shown by a drop in gage pressure from about 50 p.s.i. to less than 0 gage pressure. Ethanol was then added and the polymer isolated from each as described in the foregoing examples. The polymer from the control was obtained in 91% conversion and had an RSV of 8.9, that from the polymerization in the presence of dichlorodifluoromethane was obtained in 88% conversion and had an RSV of 8.0, and that from the polymerization in the presence of carbon tetrachloride was obtained in 84% conversion and had an RSV of 5.0.

Example 22

The hydrocarbon-insoluble reaction product catalyst component used in this example was prepared by reacting 0.181 part of diethylaluminum chloride with 0.085 part of chromium acetylacetonate (molar ratio of 6:1) in toluene and heating at 90° C. for 16 hours, after which the precipitate was separated, washed three times with toluene, and then resuspended in toluene.

Each of two polymerization vessels with a nitrogen atmosphere was charged with 33 parts of n-heptane, then evacuated, and 2 parts of ethylene was added. After equalizing at 30° C., 0.12 part of diethylaluminum chloride and the suspension of insoluble reaction product were added. To one polymerization system was added 1 part of carbon tetrabromide and the other was run as a control. After 2.8 hours the polymerization was stopped by the addition of ethanol, the gage pressure in the control having dropped from about 50 to about 9 p.s.i. and that in the polymerization in the presence of carbon tetrabromide having dropped from about 50 to about 34 p.s.i.g. The polymers were isolated in the usual manner. That from the control amounted to a conversion of 71% and had an RSV of 35.2 and that prepared in the presence of carbon tetrabromide amounted to a conversion of 30% and had an RSV of 10.7.

Example 23

The decrease in the Reduced Specific Viscosity of the polyethylene produced with increasing amounts of carbon tetrachloride added to the polymerization system is demonstrated by this example. The catalyst used in this series of polymerizations was that obtained by mixing $18.08 \times 10^{-2}$ parts of diethylaluminum chloride with $4.75 \times 10^{-2}$ parts of titanium tetrachloride (6:1 molar ratio) in n-heptane. Each of a series of 7 polymerization vessels was charged with 33 parts of n-heptane, the specified amount of carbon tetrachloride, 2 parts of ethylene, and the catalyst suspension, the polymerization being carried out and the polymer isolated as described in the foregoing examples. The amount of carbon tetrachloride added to each polymerization, the reaction time, percent conversion, and Reduced Specific Viscosity are tabulated below:

| $CCl_4$, parts | Reaction Time, hrs. | Percent Conv. | RSV |
|---|---|---|---|
| ---- | 1.0 | 97 | 25.2 |
| 0.1 | 0.5 | 85 | 11.6 |
| 0.3 | 0.5 | 88 | 9.6 |
| 1.0 | 0.5 | 89 | 7.7 |
| 2.0 | 0.5 | 87 | 8.1 |
| 5.0 | 0.5 | 94 | 5.8 |
| 10.0 | 0.5 | 97 | 4.4 |

Example 24

The catalyst used in this example was prepared by mixing 21.7 parts of diethylaluminum chloride with 11.4 parts of titanium tetrachloride (3:1 molar ratio) in 407 parts of n-heptane and aging for 1 hour at 50° C. before use. A polymerization vessel in which the air had been replaced with nitrogen was charged with the above catalyst suspension and an additional amount of n-heptane to make a total of 3960 parts. Ethylene was then passed in an atmospheric pressure and at a temperature of 48° C., and 15 minutes after the ethylene flow began and with the temperature at 60° C., 15 parts of carbon tetrachloride was added to the polymerization mixture. The temperature was held at 56–65° C. and at the end of 3 hours and 40 minutes the flow of ethylene was stopped, 243 parts of butanol was added and the reaction mixture was cooled and allowed to stand at room temperature for 16 hours. The polymer was collected by filtration under nitrogen, washed three times with n-heptane under nitrogen and then washed three times with acetone in air and air-dried. The polyethylene so obtained amounted to 658 parts, had a reduced specific viscosity of 3.6, and contained 2% of a hot benzene-soluble fraction.

Example 25

A series of ethylene polymerizations was made with varying amounts of carbon tetrachloride, as a molecular weight control, being added. In each case the catalyst was prepared by mixing 1.8 parts of diethyaluminum chloride with 0.95 part of titanium tetrachloride (molar ratio of 2.9:1) in 26 parts of toluene (containing 26–36 p.p.m. of water) and aging for 60 minutes at 50° C. Additional toluene was then added to bring the total to 433 parts and with the temperature held at about 55° C. ethylene was passed into the reaction mixture at atmospheric pressure. After 15–20 minutes a specified amount of carbon tetrachloride was added. At the end of the designated reaction time, the ethylene flow was replaced by nitrogen and after cooling to room temperature a mixture of 40 parts of 95% ethanol and 216 parts of toluene was added. The polymer was separated by filtration, washed three times with 216 parts of toluene and three times with 200 parts of acetone and dried at 70° C. in vacuo for 4 hours. In addition to the solid polymer, a waxlike polymer was obtained by removal of the solvent from the filtrate and toluene washings. The amount of carbon tetrachloride added, reaction time, yield and viscosity of the solid polymer, and yield of waxlike polymer obtained in each case are given below:

| CCl₄, parts | Reaction Time, hrs. | Solid Polymer | | Wax, parts |
|---|---|---|---|---|
| | | Parts | RSV | |
| ---- | 2.5 | 106 | 17.7 | 1.6 |
| 1.3 | 3.0 | 108 | 8.3 | 1.8 |
| 2.4 | 3.0 | 109 | 7.2 | 1.3 |
| 4.9 | 3.0 | 84 | 5.2 | 1.8 |
| 10.0 | 2.5 | 58 | 5.1 | 2.3 |

*Example 26*

The procedure of Example 25 was repeated except that the diluent was n-heptane (total of 350 parts). The amount of carbon tetrachloride added, reaction time, and yield and viscosity of the polymer are given in the following tabulation:

| CCl₄, parts | Reaction Time, hrs, | Solid Polymer | | Wax, parts |
|---|---|---|---|---|
| | | Parts | RSV | |
| ---- | 2.3 | 76.1 | 18.3 | 0.5 |
| 0.65 | 2.1 | 66.4 | 11.0 | 0.6 |
| 1.35 | 2.3 | 74.3 | 9.0 | 0.5 |
| 5.0 | 2.3 | 71.7 | 5.3 | 1.0 |

*Example 27*

The effect of adding the haloalkane all at one time and adding it continuously is demonstrated in this example. In each polymerization, the catalyst was prepared by mixing 2.3 parts of diethyaluminum chloride with 0.83 part of titanium tetrachloride (2.8 molar ratio) in n-heptane and aging for 1 hour at 50° C. The mixture was then diluted to a total of 350 parts of n-heptane and ethylene was passed into the reaction mixture at atmospheric pressure. In (a) no haloalkane was added, in (b) it was added continuously starting 20 minutes after the ethylene flow was started and over a period of 95 minutes, and in (c) and (d) the haloalkane was added all at one time, 20 minutes after the ethylene flow was started. The solid polymer and wax were isolated as in Example 25. The haloalkane added and amount thereof, reaction time, and yield and viscosity of the polymer produced in each case are tabulated below:

| | Haloalkane | Parts | Reaction Time, minutes | Polymer | | Wax, parts |
|---|---|---|---|---|---|---|
| | | | | Parts | RSV | |
| (a) | | | 125 | 83 | 20.3 | 0.35 |
| (b) | CCl₄ | 1.34 | 140 | 103 | 15.8 | 0.75 |
| (c) | CCl₄ | 1.33 | 140 | 81 | 7.0 | 1.3 |
| (d) | CBr₄ | 1.30 | 130 | 45 | 7.2 | 0.44 |

*Example 28*

The catalyst used in each of this series of polymerizations was prepared by mixing 1.78 parts of diethylaluminum chloride and 1.0 part of titanium tetrachloride (molar ratio of 2.82) in 15.7 parts of isooctane and aging for 1.3 hours at 100° C. The catalyst suspension was then diluted to a total of 350 parts of isooctane and the specified amount of carbon tetrachloride was added. With the temperature held at about 50° C., ethylene was passed into the reaction mixture at atmospheric pressure for 4 hours. The polymerization was then stopped by adding 8 parts of methanol and the polymer was isolated by filtering, washing three times with isooctane, two times with acetone, and drying in vacuo at 60° C. The waxlike polymer was isolated by removal of the solvent from the filtrate and isooctane washes and drying in vacuo at 60° C. The amount of carbon tetrachloride added, yield of solid polymer and wax (as percent of the total polymer), and reduced specific viscosity for each are tabulated below:

| CCl₄, parts | Polymer | | Wax, percent of Total Polymer |
|---|---|---|---|
| | Parts | RSV | |
| ---- | 17.3 | 34.5 | 4.7 |
| 1.57 | 31.4 | 8.3 | 3.0 |
| 2.73 | 29.5 | 8.9 | 3.4 |

As may be seen from the foregoing examples, the process of this invention makes it possible to polymerize ethylene at ordinary pressure and temperature by the process of the previously mentioned Ziegler applications and at the same time control the molecular weight of the polymer produced. As demonstrated by these examples, if only a slight reduction in the molecular weight of the polymer is desired, one may add one of the less active haloalkanes or a reduced quantity of a very active haloalkane. On the other hand, if it is desired to obtain a polymer having a molecular weight in the lower bracket of polyethylene molecular weights, a more active haloalkane, such as carbon tetrachloride or tetrabromide, is used, the amount added depending on the molecular weight desired. The haloalkane may be added to the polymerization system at any stage, as for example, prior to the introduction of ethylene, after flow of the ethylene is begun or continuously throughout the polymerization reaction. Obviously, many other variations of the process may be made.

What I claim and desire to protect by Letters Patent is:

1. The process of polymerizing ethylene which comprises contacting ethylene with a catalyst, formed by mixing a compound of a metal selected from the group consisting of titanium and chromium with an organometallic compound of a metal selected from the group consisting of alkali metals, alkaline earth metals, zinc, earth metals and the rare earth metals, and in the presence of at least about 0.001% of a polyhaloalkane having the formula

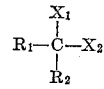

where $X_1$ is one of the group consisting of chlorine and bromine, and when $X_1$ is chlorine, $X_2$ is one of the group consisting of chlorine and bromine and when $X_1$ is bromine, $X_2$ is one of the group consisting of chlorine, bromine, iodine, and fluorine, and $R_1$ and $R_2$ are each one of the group consisting of hydrogen, chlorine, bromine, fluorine, alkyl, chloroalkyl, bromoalkyl, and fluoroalkyl radicals.

2. The process of polymerizing ethylene which comprises contacting ethylene with a catalyst, formed by mixing titanium tetrachloride with an organoaluminum compound, and in the presence of at least about 0.001% of a polychloromethane.

3. The process of polymerizing ethylene which comprises contacting ethylene with a catalyst, formed by mixing titanium tetrachloride with an organoaluminum compound, and in the presence of at least about 0.001% of a polybromomethane.

4. The process of polymerizing ethylene which comprises contacting ethylene with a catalyst, formed by mixing titanium tetrachloride with an organoaluminum compound, and in the presence of at least about 0.001% of a polyhalomethane containing both bromine and chlorine.

5. The process of polymerizing ethylene which comprises contacting ethylene with a catalyst, formed by mixing titanium tetrachloride with an organoaluminum compound, and in the presence of at least about 0.001% of carbon tetrachloride.

6. The process of polymerizing ethylene which comprises contacting ethylene with a catalyst, formed by mixing titanium tetrachloride with an organoaluminum compound, and in the presence of at least about 0.001% of carbon tetrabromide.

7. The process of polymerizing ethylene which comprises contacting ethylene with a catalyst, formed by mixing titanium tetrachloride with an organoaluminum compound, and in the presence of at least about 0.001% of bromotrichloromethane.

8. The process of polymerizing ethylene which comprises contacting ethylene with a catalyst, formed by mixing titanium tetrachloride with an alkyl aluminum halide, and in the presence of at least about 0.001% of carbon tetrachloride.

9. The process of polymerizing ethylene which comprises contacting ethylene with a catalyst, formed by mixing titanium tetrachloride with a trialkylaluminum, and in the presence of at least about 0.001% of carbon tetrachloride.

10. The process of polymerizing ethylene which comprises contacting ethylene with a catalyst, formed by mixing titanium tetrachloride with an alkyl aluminum halide, and in the presence of carbon tetrabromide.

11. The process of polymerizing ethylene which comprises contacting ethylene with a catalyst, formed by mixing titanium tetrachloride with an alkyl aluminum halide, and in the presence of bromotrichloromethane.

12. The process of polymerizing ethylene which comprises contacting ethylene with a catalyst, formed by mixing titanium tetrachloride with a trialkylaluminum, and in the presence of at least about 0.001% of bromotrichloromethane.

13. The process for polymerizing ethylene to solid polymers which comprises contacting ethylene with a catalyst produced by admixing (1) a titanium halide, (2) a haloalkane having at least one carbon atom substituted by at least three halogens, wherein the halogen is a member of the class consisting of chlorine and bromine, and (3) a reducing agent having at least one metal to hydrocarbon bond, said halohydrocarbon being admixed in at least equimolar quantities on the basis of the titanium halide but insufficient to retard polymerization.

14. The process which comprises (1) contacting a titanium chloride with an aluminum alkyl in the presence of a saturated chlorohydrocarbon having at most two carbon atoms and having at least one carbon atom substituted by at least three chlorine atoms, said chlorohydrocarbon being present in at least equimolar quantities on the basis of the combined moles of said titanium chloride and aluminum alkyl, (2) contacting ethylene with the product of step (1), and (3) recovering a solid polymerization product of ethylene.

15. A composition of matter useful as a catalyst for the production of solid polymers comprising the product obtained on admixing a titanium chloride with a saturated chlorohydrocarbon, having at least one carbon atom substituted by at least three chlorine atoms, and an organometallic compound of aluminum, having at least one metal-to-hydrocarbon bond, in an inert liquid hydrocarbon, said chlorohydrocarbon being present in at least equimolar quantities on the basis of the combined moles of said titanium chloride and organometallic compound of aluminum.

References Cited

UNITED STATES PATENTS

| | | | |
|---|---|---|---|
| 2,440,498 | 4/1948 | Young et al. | 260—683.15 |
| 2,440,800 | 5/1948 | Hanford et al. | 260—94.9 |
| 2,721,189 | 10/1955 | Anderson | 260—93.1 |

FOREIGN PATENTS

| | | |
|---|---|---|
| 533,362 | 5/1955 | Belgium. |

JOSEPH L. SCHOFER, Primary Examiner.

W. BENGEL, M. LIEBMAN, A. M. BOETTCHER,
Examiners.

M. B. KURTZMAN, H. N. BURSTEIN,
W. J. VANBALEN, Assistant Examiners.

UNITED STATES PATENT OFFICE
CERTIFICATE OF CORRECTION

Patent No. 3,354,139            November 21, 1967

Edwin J. Vandenberg

It is hereby certified that error appears in the above numbered patent requiring correction and that the said Letters Patent should read as corrected below.

Column 3, lines 26 and 27, for "alkali alkyls" read -- alkali metal alkyls --; column 5, line 75, for "engaged" read -- charged --; column 11, line 29, after "of" insert -- at least about 0.001% of --; line 33, after "of" insert -- at least about 0.001% of --.

Signed and sealed this 7th day of January 1969.

(SEAL)
Attest:

Edward M. Fletcher, Jr.
Attesting Officer

EDWARD J. BRENNER
Commissioner of Patents